(12) United States Patent
Rule et al.

(10) Patent No.: US 8,592,034 B2
(45) Date of Patent: Nov. 26, 2013

(54) DEBONDABLE ADHESIVE ARTICLE

(75) Inventors: Joseph D. Rule, Cottage Grove, MN (US); Kevin M. Lewandowski, Inver Grove Heights, MN (US); Michael D. Determan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 449 days.

(21) Appl. No.: 12/814,553

(22) Filed: Jun. 14, 2010

(65) Prior Publication Data

US 2010/0316845 A1 Dec. 16, 2010

Related U.S. Application Data

(60) Provisional application No. 61/187,497, filed on Jun. 16, 2009.

(51) Int. Cl.
*C09J 7/02* (2006.01)

(52) U.S. Cl.
USPC ............ 428/346; 428/141; 428/172; 428/343

(58) Field of Classification Search
USPC ................................. 428/172–173
See application file for complete search history.

(56) References Cited

U.S. PATENT DOCUMENTS

| | | |
|---|---|---|
| 2,458,152 A | 1/1949 | Eakins |
| RE24,906 E | 12/1960 | Ulrich |
| 3,661,744 A | 5/1972 | Kehr et al. |
| 4,181,752 A | 1/1980 | Martens et al. |
| 4,303,485 A | 12/1981 | Levens |
| 4,436,858 A | 3/1984 | Klosiewicz |
| 4,619,979 A | 10/1986 | Kotnour et al. |
| 4,629,663 A | 12/1986 | Brown et al. |
| 4,737,559 A | 4/1988 | Kellen et al. |
| 4,808,638 A | 2/1989 | Steinkraus et al. |
| 5,139,832 A | 8/1992 | Hayashi et al. |
| 5,145,935 A | 9/1992 | Hayashi |
| 5,155,199 A | 10/1992 | Hayashi |
| 5,182,360 A | 1/1993 | Jacobine et al. |
| 5,226,979 A * | 7/1993 | Thoma .......................... 148/402 |
| 5,506,300 A | 4/1996 | Ward et al. |
| 5,558,937 A | 9/1996 | Woods et al. |
| 5,589,246 A | 12/1996 | Calhoun et al. |
| 5,637,646 A | 6/1997 | Ellis |
| 5,641,567 A | 6/1997 | Brown et al. |

(Continued)

FOREIGN PATENT DOCUMENTS

| | | |
|---|---|---|
| JP | 2959775 | 9/1990 |
| JP | 2255830 | 10/1990 |
| JP | 07126125 | 5/1995 |
| JP | 2000-230130 | * 8/2000 |

(Continued)

OTHER PUBLICATIONS

Gorden, "Applications of Shape Memory Polyurethanes," Proceedings of the First International Conference on Shape Memory and Superelastic Technologies, SMST International Committee, pp. 115-119, (1994).

(Continued)

*Primary Examiner* — Maria Veronica Ewald
*Assistant Examiner* — Megha Mehta
(74) *Attorney, Agent, or Firm* — Kent S. Kokko

(57) ABSTRACT

An adhesive article is described that is debondable from substrates or adherends with the application of heat.

19 Claims, 2 Drawing Sheets

(56) References Cited

U.S. PATENT DOCUMENTS

| | | | |
|---|---|---|---|
| 5,665,822 | A | 9/1997 | Bitler et al. |
| 5,804,610 | A | 9/1998 | Hamer et al. |
| 5,888,650 | A * | 3/1999 | Calhoun et al. ............... 428/354 |
| 6,060,159 | A * | 5/2000 | Delgado et al. ............... 428/343 |
| 6,160,084 | A | 12/2000 | Langer et al. |
| 6,388,043 | B1 | 5/2002 | Langer et al. |
| 6,849,837 | B2 | 2/2005 | Riess et al. |
| 7,173,096 | B2 | 2/2007 | Mather et al. |
| 2005/0244353 | A1 | 11/2005 | Lendlein et al. |
| 2006/0041089 | A1 | 2/2006 | Mather et al. |
| 2006/0088494 | A1 | 4/2006 | Lendlein et al. |
| 2006/0140892 | A1 | 6/2006 | Lendlein et al. |
| 2007/0009465 | A1 | 1/2007 | Lendlein et al. |
| 2007/0142562 | A1 | 6/2007 | Mather et al. |
| 2008/0292848 | A1 | 11/2008 | Xie et al. |
| 2010/0098932 | A1 | 4/2010 | Xie et al. |

FOREIGN PATENT DOCUMENTS

| | | |
|---|---|---|
| JP | 200326805 | 1/2003 |
| WO | WO 02/33017 | 4/2002 |
| WO | WO 03/084489 | 10/2003 |
| WO | WO 2004/113464 | 12/2004 |

OTHER PUBLICATIONS

Kim, et al., "Polyurethanes having shape memory effect," Polymer, vol. 37, No. 26, pp. 5781-5793, (1996).

Li et al., "Crystallinity and Morphology of Segmented Polyurethanes with Different Soft-Segment Length," Journal of Applied Polymer Science, vol. 62, No. 4, pp. 631-638, (1996).

Takahashi et al., "Structure and Properties of Shape-Memory Polyurethane Block Polymers," Journal of Applied Polymer Science, vol. 60, No. 7, pp. 1061-1069, (1996).

Tobushi et al., "Thermomechanical properties of shape memory polymers of polyurethane series and their applications," Journal De Physique IV, Colloque C1, vol. 6, pp. 377-384, (1996).

Behl et al., "Actively moving polymers," Soft Matter, vol. 3, pp. 58-67, (2007).

Jeon et al., "Shape memory and nanostructure in poly(norbornyl-POSS) copolymers," Polymer International, vol. 49, pp. 453-457, (2000).

Lendlein et al., "Shape Memory Polymers," Shape-Memory Effect From Temporary Shape to Permanent Shape, Angewandte Chemie International Edition, vol. 41, pp. 2034-2057, (2002).

Yakacki et al., "Strong, Tailored, Biocompatible Shape-Memory Polymer Networks," Advanced Functional Materials, vol. 18, No. 16, pp. 2428-2435, (2008).

Safranski et al., "Effect of chemical structure and crosslinking density on the thermo-mechanical properties and toughness of (meth)acrylate shape memory polymer networks," Polymer, vol. 49, pp. 4446-4455, (2008).

Xie et al., "Self-Peeling Reversible Dry Adhesive System," Chemistry of Materials, vol. 20, No. 9, pp. 2866-2868, Apr. 5, 2008.

PCT International Search Report, PCT/US2010/037953.

* cited by examiner

DEBONDABLE ADHESIVE ARTICLE

CROSS REFERENCE TO RELATED APPLICATION

This application claims the benefit of U.S. Provisional Patent Application No. 61/187,497, filed Jun. 16, 2009, the disclosure of which is incorporated by reference herein in its entirety.

FIELD OF THE INVENTION

The instant disclosure is directed to an adhesive article which is debondable from substrates or adherends with the application of heat.

BACKGROUND

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.).

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

In some instances, it is desirable to debond the adhesive and free the substrates or adherends bonded thereto.

SUMMARY OF THE INVENTION

In some instances, it is desirable to debond the adhesive and free the substrates or adherends bonded thereto. The present disclosure provides an adhesive article that may be adhered to a substrate, and subsequently debonded with the application of heat. As used herein, the term a "debonding adhesive article" refers to an adhesive article that shows initial adhesion controlled by the pressure of application and a decrease of the adhesion level after the application of heat. The decrease in adhesion level remains after the adhesive article has cooled.

The adhesive article comprises a shape memory polymer backing having a temporary, deformed shape and a pattern of latent projections on at least the first surface thereof; and an amorphous pressure sensitive adhesive layer coated on the first surface of the shape memory polymer backing; the surface bearing the latent projections. In other embodiments the second major surface of the backing may further comprise a shape memory polymer backing have a temporary, deformed shape and latent projections on the second surface thereof; and an amorphous pressure sensitive adhesive layer coated on the second surface of the shape memory polymer backing. In yet another embodiment, the adhesive article comprises a shape memory polymer backing having a temporary, deformed planar shape and a pattern of latent projections on at least the first surface thereof; and amorphous pressure sensitive adhesive layers on the first and second surfaces of the shape memory polymer backing.

The disclosure further provides a method of using the debondable adhesive article comprising affixing the adhesive article to a substrate, and heating the adhesive article such that the article recovers the permanent shape and the projections extend from the first surface of the adhesive article, the projections weaken the bond with the substrate. In use, the latent projections become patent as the article recovers the original permanent shape.

DETAILED DESCRIPTION

Figure 1:
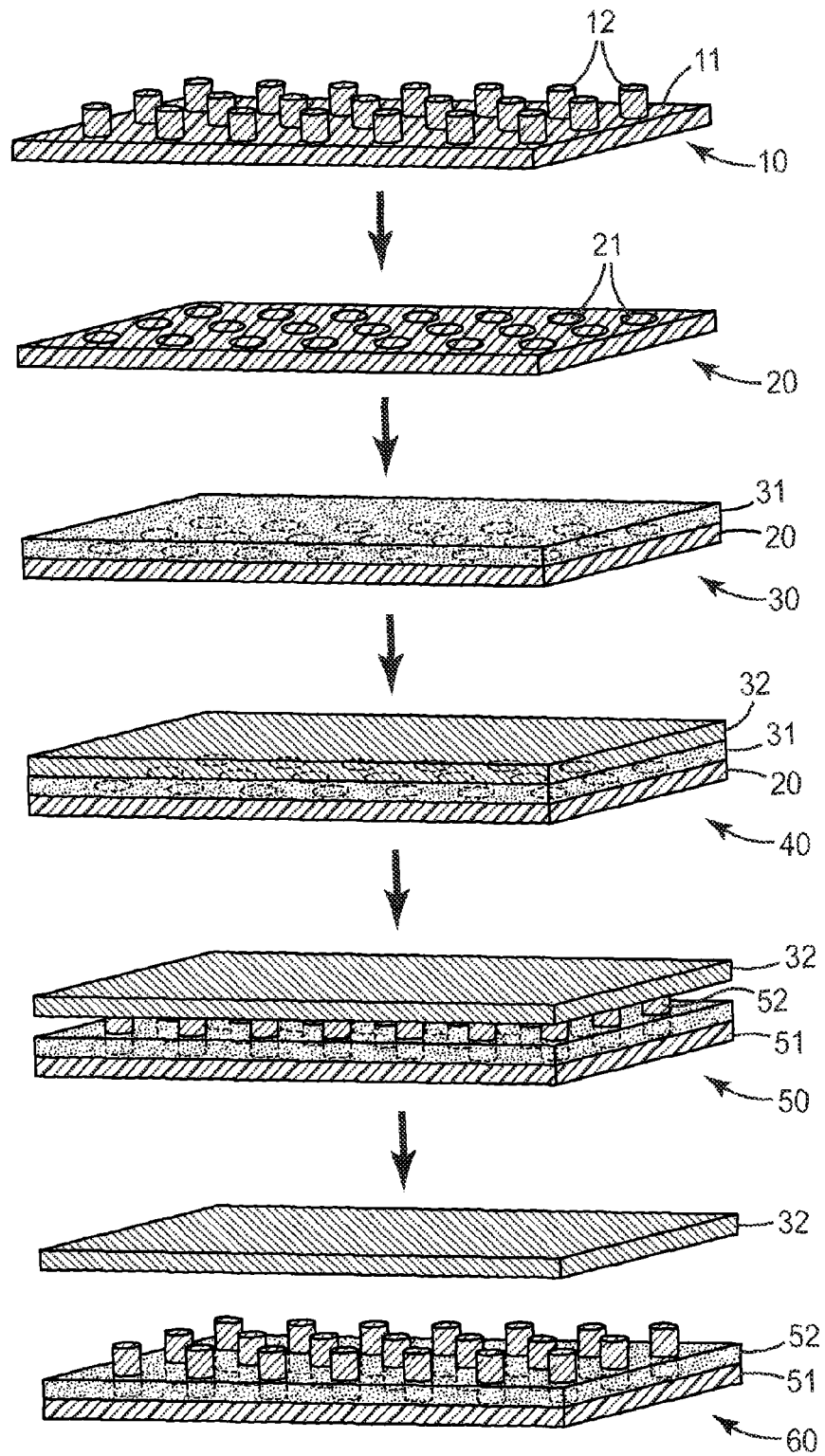
FIG. 1 is a schematic of the preparation of the article, the use thereof in bonding to a substrate, and subsequently debonding therefrom.

The adhesive article comprises a substantially planar backing comprising a shape memory polymer.

The adhesive article comprises, in part, a backing layer comprising a shape memory polymer. The backing layer has a pattern of latent projections on at least one surface thereof. The polymer is first cast and cured into the desired permanent shape have a patent pattern of projections on at least one surface thereof, and subsequently deformed into a temporary, substantially planar shape. The deformed projections have assumed a temporary, latent shape; i.e., the projections have been flattened are not evident when coated with an adhesive layer.

Shape memory polymers are known to have the unique ability to be set in a permanent shape, deformed to an altered temporary shape, and then revert back to the permanent shape when exposed to heat. Because the backings of the adhesive articles comprise a shape memory polymer, the backing can be configured to utilize this property. For example, the backing may be cast or otherwise shaped to having a permanent shape or configuration comprising a pattern of projections from a planar surface. This surface can be deformed to a temporary substantially planar or latent shape and then recovered to the permanent shape or patent shape when heated. Heating causes the projections to recover, thereby weakening the adhesive bond between the adhesive article and substrate or adherend.

Shape memory polymers can be classified as elastomers. On the molecular level they represent polymer networks that include segment chains that are connected by netpoints. The netpoints can be formed by entanglements of the polymer chains or intermolecular interaction of certain polymer blocks. These cross-links are called physical netpoints. Crosslinks in the form of covalent bonds form chemical netpoints. An elastomer exhibits shape-memory behavior if the material can be stabilized in the deformed state in a temperature range that is relevant for the particular application. This can be achieved by using the network chains as a kind of molecular switch. For this purpose, it should be possible to limit the flexibility of the segments as a function of temperature. This process is supposed to be reversible. The ability to incorporate a control function into the material provides a thermal transition $T_{trans}$ of the network chains in the temperature range of interest for the particular application. At temperatures above $T_{trans}$ the chain segments are flexible, whereas the flexibility of the chains below this thermal transition is at least partially limited. In the case of a transition from the rubber-elastic, i.e., viscous, to the glassy state the flexibility of the entire segment is limited.

Without being bound to theory, it is believed that the copolymer network includes an elastomeric phase or component and a "glassy" or high glass transition temperature phase or component. The glassy phase holds or constrains the elastomeric component so that the substrate can be deformed into and stays in the deformed shape. Shifting from a deformed shape to the original or permanent shape generally includes mobilizing the glassy phase of the shape memory polymer in order to allow the elastomeric component to "recover" or otherwise shift to the original permanent shape. According to this theory, mobilizing is understood to be the mobilization of the glassy phase through the application of the appropriate external stimuli.

SMPs have a defined melting point ($T_m$) or glass transition temperature ($T_g$). Collectively, the melting point ($T_m$) or glass transition temperature ($T_g$) will be referred to as the transition temperature or $T_{trans}$. Above the $T_{trans}$ the polymers are elastomeric in nature, and are capable of being deformed with high strain. The elastomeric behavior of the polymers results from either chemical crosslinks or physical crosslinks (often resulting from microphase separation). Therefore, SMPs can be glassy or crystalline and can be either thermosets or thermoplastics.

The permanent shape of the SMP backing is established when the crosslinks are formed in an initial casting or molding process. The SMP can be deformed from the original shape to a temporary shape. This step is often done by heating the polymer above its $T_{trans}$ and deforming the sample, and then holding the deformation in place while the SMP cools. Alternatively, in some instances the polymer can be deformed at a temperature below its $T_{trans}$ and maintain that temporary shape. Subsequently, the original shape is recovered by heating the material above the melting point or glass transition temperature.

The recovery of the original shape, which may be induced by an increase in temperature, is called the thermal shape memory effect. Properties that describe the shape memory capabilities of a material are the shape recovery of the original shape of the backing and the shape fixity of the temporary shape of the backing. The advantages of the SMPs will be closely linked to their network architecture and to the sharpness of the transition separating the rigid and rubber states. SMPs have an advantage of capacity for high strain: to several hundred percent.

Many shape memory polymers may be used in the preparation of the backing of the adhesive article. In some embodiments the shape memory polymer composition may be cast into a permanent shape, having a pattern of projections on at least one surface thereof, and deformed to a temporary shape at a temperature below the $T_{trans}$ so the deformed temporary shape is retained. Alternatively, the shape memory polymer composition may be cast into a permanent shape, deformed at a temperature above the $T_{trans}$ and then cooled to a temperature below the $T_{trans}$ so the deformed temporary shape is retained. With either deformation method, when the deformed article is heated above the $T_{trans}$ the deformed article will elastically recover the permanent shape.

Generally, the SMP is chosen such that the $T_{trans}$ is at a temperature suitable for the desired adhesive application, and above any temperatures to which the adherend might be expected to be exposed. In some embodiments the $T_{trans}$ at least 30° C., at least 100° C., or at least 125° C. Generally the shape memory polymer will have an elastic modulus of at least 0.5 at 80°. Useful shape memory polymers will have at least 100% elongation at break near the $T_{trans}$.

Useful SMPs may be physically or chemically crosslinked. Chemically crosslinked, thermoset shape memory polymers are preferred. Examples of suitable physically crosslinked SMP include, but are not limited to, linear block copolymers, such as thermoplastic polyurethane elastomers with a hard segment to give the permanent shape and a soft segment to give a switching temporary shape. Multiblock copolymers can also serve as SMP, such as polyurethanes with a polystyrene and poly(1,4-butadiene), ABA triblock copolymers of poly(tetrahydrofuran) and poly(2-methyl-2-oxazoline), polynorbornene, polyhedral oligomeric silsequioxane (POSS)—modified polynorbornene, and PE/Nylon-6 grafted copolymer.

Examples of polymers that have been utilized in hard and soft phases of shape memory polymers include polyurethanes, polynorbornenes, polyethers, polyacrylates, polyamides, polysiloxanes, polyether amides, polyether esters, trans-polyisoprenes, polymethylmethacylates, cross-linked trans-polyoctylenes, cross-linked polyethylenes, cross-linked polyisoprenes, cross-linked polycyclooctenes, inorganic-organic hybrid polymers, copolymer blends with polyethylene and styrene-butadiene co-polymers, urethane-butadiene co-polymers, PMMA, polycaprolactone or oligo caprolactone copolymers, PLLA or PL/D LA co-polymers, PLLA PGA co-polymers, and photocrosslinkable polymers including azo-dyes, zwitterionic, and other photochromatic materials such as those described in "Shape Memory Materials" by Otsuka and Wayman, Cambridge University Press 1998, the entire contents of which are incorporated herein by reference. Examples of suitable chemical crosslinked shape-memory polymers include, but are not limited to, HDPE, LDPE, copolymer of PE and polyvinyl acetate.

Suitable shape memory polymers include but are not limited to those described in WO 03/084489; U.S. Pat. No. 5,506,300 (Ward et al.), U.S. Pat. No. 5,145,935 (Hayashi), U.S. Pat. No. 5,665,822 (Bitler et al.). Other SMPs are described in U.S. Pat. No. 5,155,199 (Hayashi), U.S. Pat. No. 7,173,096 (Mather et al.), U.S. 2007/0142562 (Mather), U.S. Pat. No. 4,436,858 (Klosiewicz), U.S. Pat. No. 4,808,638 (Steinkraus), U.S. Pat. No. 5,558,937 (Woods), U.S. Pat. No. 3,661,744 (Kehr), U.S. Pat. No. 5,182,360 (Jacobine), JP 07126125, JP 2959775, JP 2255830, JP 2959775, EP 4986602, U.S. 2005/244353 (Lendlein et al.), and U.S. 2007/009465 (Lendlein et al.), U.S. Pat. No. 6,160,084 (Langer), U.S. Pat. No. 6,388,043 (Langer), the disclosure of which are hereby incorporated by reference herein.

Reference may also be made to Gorden, "Applications of Shape Memory Polyurethanes," *Proceedings of the First International Conference on Shape Memory and Superelastic Technologies*, SMST International Committee, pp. 115-19 (1994); Kim, et al., "Polyurethanes having shape memory effect," *Polymer* 37(26):5781-93 (1996); Li et al., "Crystallinity and morphology of segmented polyurethanes with different soft-segment length," *J Applied Polymer* 62:631-38 (1996); Takahashi et al., "Structure and properties of shape-memory polyurethane block polymers," *J. Applied Polymer Science* 60:1061-69 (1996); Tobushi H., et al., "Thermomechanical properties of shape memory polymers of polyurethane series and their applications," *J Physique IV* (Colloque Cl) 6:377-84 (1996)), M. Bell et al., "Actively Moving Polymers" Soft Matter, 2007, 3, 58-67 (2007); H. G. Jeon et al., "Shape Memory and nanostructure in poly(norbornyl-POSS) copolymers", Polym. Int., 49:453-457 (2000); and A. Lendlein et al., "Shape Memory Polymers, Andew. Chem. Int. Ed., 41:2034-2057 (2002).

Acrylic SMP are disclosed in U.S. 2006/041089 (Mather et al.), C. M. Yakachi et al., in *Advanced Functional Materials*, 18 (2008), 2428-2435, and D. L. Safranski et al., in *Polymer* 49 (2008)4446-4455.

Commercially available thermoplastic SMPs include, but are not limited to, polyacrylates such as the PMMA and JTbu series (PolymerExpert), cycloaliphatic polyutherurethane Tecoflex (TFX) (Noveon), polyurethane foam of polyether polyol series—Diary, including the MM type, MP type, MS type and MB (microbead powder) type series (Diaplex Co. Ltd.)., "Calo-MER" from the Polymer Technical Group, elastic memory composite ("EMC") from Composite Technology Development, Inc. or "Veriflex" from Cornerstone Research Group ("CRG").

The SMP backing may be prepared from the shape memory polymer compositions by any suitable technique used for thermoplastic or thermoset polymers. The shaped articles may be cast into a suitable mold and cured, or injection molded, such as by reaction injection molding (RIM) whereby the polymer composition is injected into a mold and cured. Alternatively, in the case of thermoplastic polymers, the articles may be extruded. The shape memory polymers are cast or molded to impart a permanent shape which is substantially planar, and has a pattern of projections from one of both major surface(s).

The shape and/or configuration of the projections can vary. For example, projections can include one or more ridges, posts, pyramids, hemispheres, cones, protrusion, or any other suitable feature. The shapes of the various projections can also vary. For example, some embodiments of projections can be rounded in shape (e.g., circular, semicircular, spherical, hemispherical, oval, pill-shaped, partially pill-shaped, etc.) or include a rounded portion, polygonal in shape or include a polygonal portion (e.g., triangular, squared, cubed including cube corners, tetrahedrical, rectangular, paralleopiped, pentagonal, hexagonal, etc.), an irregular shape, a regular shape, a pointed shape, a truncated shape, combinations thereof, or any other suitable shape. In at least some of these as well as in other embodiments, the projections may include or define one or more channels, valleys, wells, ridges, and the like, combinations thereof, or any other configuration.

The dimensions of the projections may vary. Generally, the dimension of the projection normal to the plane of the backing (designated depth herein) is greater than the thickness of the adhesive layer coated thereon. In some embodiments, the depths of the projections are 0.01" to 0.05" (0.25 to 1.27 mm) normal to the plane of the backing. In some embodiments the width and length or diameter of the projections are from 0.04" to 0.07" (1.01 to 1.78 mm), in the plane of the backing. It is preferred that the projections present a planar cross section at the end thereof, rather than round or pointed ends. It is believed that planar ends will allow for more uniform distribution of strain during the deformation of the projections, thus preventing failure of the backing during deformation.

The projections are desirably solid rather than hollow. It has been determined that embossed surface features having a projection on one surface and a corresponding depression on the opposite surface do not debond during heat activated recovery. In the case of features with a corresponding depression on the opposite face, the deformation of the backing primarily involves pushing the projection into the space on opposite surface, and this deformation does not store a high level of elastic energy. Therefore, it is preferred that the projection does not correspond with a depression on the other major surface. In the absence of the corresponding depression on the second major surface, the deformation of the backing requires compression of the projection and a corresponding high elastic force. This high elastic force produces a greater recovery force that is useful for debonding the pressure sensitive adhesive (PSA) from the substrate.

At least one major surface of the otherwise substantially planar backing comprises a pattern of projections. In some embodiments, both major surfaces can comprise patterns of projections. It will be understood, that in preferred embodiments, a projection on one major surface does not have a corresponding depression on the other major surface.

Projections may be formed on a surface of a backing through the use of a molding tool, which is an implement for imparting the structure to at least a portion of a backing and that may be continuously reused in the process. Molding tools can be in the form of a planar stamping press, a flexible or inflexible belt, a roller, or the like. Furthermore, molding tools are generally considered to be tools from which the surface projections are generated by embossing, coating, casting, or platen pressing and do not become part of the finished backing Instead, a surface on the backing corresponding to where the article came into contact with the structured surface of the molding tool defines the projection.

The backing layer, thus configured may be a sheet or film having a pattern of projections on one or both major surfaces and may be substantially planar in the areas between the projections. The backing layer is then deformed to a second, temporary configuration whereby the one or both surfaces are rendered substantially planar; i.e., the projections are flattened. Upon deformation or flattening of the projections, the backing layer may be described as having a pattern of latent projections. These latent projections may be released by the application of heat whereby the shape memory polymer backing recovers the original, permanent shape. The pattern of latent projections is not evident when subsequently coated with an adhesive layer.

The original formed backing, having a first permanent shape having a pattern of projections on one or both major surface(s), may be deformed into a substantially planar backing layer by either of two methods. In the first, the patterned backing is heated above the $T_{trans}$, deformed to impart a temporary shape, then cooled below the $T_{trans}$ to lock in the temporary shape. In the second, the patterned backing is deformed at a temperature below the $T_{trans}$ by the application of mechanical force, whereby the shaped article assumes a second temporary, substantially planar, shape through forced deformation; i.e., cold drawing. When significant stress is applied, resulting in an enforced mechanical deformation at a temperature lower than the $T_{trans}$, strains are retained in the polymer, and the temporary shape change is maintained, even after the partial liberation of strain by the elasticity of the polymer.

The patterned backing may be subsequently deformed in at least one dimension; perpendicular to the first and/or second major surface(s). In some embodiments the patterned backing may be deformed in a second and/or third dimensions parallel with the major surfaces of the article. All or a portion of the patterned backing may be deformed by mechanical deformation. The patterned backing may be deformed by any desired method including embossing, compression, twisting, shearing, bending, cold molding, stamping, stretching, uniformly or non-uniformly stretching, or combinations thereof.

In a preferred embodiment the patterned backing is calendered to deform the article to a substantially planar configuration. Calendering is preferably performed with the film initially at or above the $T_{trans}$ and the rollers at or below the $T_{trans}$.

The final thickness of the backing will be determined in part by the casting thickness, and the calendering thickness and the degree of orientation in the planar dimensions, if any. For most uses, the final thickness of the deformed patterned backing prior to coating with the adhesive will be 0.001" to 0.06" (0.025 to 1.52 mm), preferably 0.002" to 0.02" (0.051 to 0.51 mm).

In one embodiment the backing may be prepared by the method comprising the steps of: providing a curable liquid polymer precursor; casting the precursor against a first tool assembly having a first surface structure; curing the precursor to form a shape memory polymer backing having one or more patterned surfaces with a permanent shape having projections from at least the first surface, the substrate comprising a shape memory polymer; removing the substrate from the first tool assembly; deforming the pattern-bearing surfaces of the backing with a second tool assembly having a substantially planar surface to form a deformed surface on the substrate wherein the deformation flattens, or renders latent, the projections.

Other useful additives which can be included in the backing include, but are not limited to, fillers, pigments, plasticizers, foaming agents, antioxidants, stabilizers, fire retardants, and viscosity adjusting agents.

On deforming the backing to a substantially planar shape, a pressure sensitive may be coated on the surface having a pattern of latent projections. Optionally, an adhesive layer may be coated on a second surface of the backing, the second surface being patterned or unpatterned. The adhesive may be any amorphous, pressure sensitive adhesive. It is found that amorphous adhesives, having no crystallinity, have better peel and shear strength, better tack, and a greater useful temperature range without debonding prematurely. In addition, amorphous adhesives are generally less expensive and are easier to process than adhesives having a crystalline component.

The adhesive includes at least one crosslinked polymeric material having pressure sensitive adhesive properties. As used herein, "elastomeric" materials can be described, for example, as amorphous or noncrystalline materials that can be stretched to at least twice their original length and that will retract rapidly and forcibly to substantially (generally at least about 75% of; preferably, at least about 90% of) their original dimensions upon release of the force. The term "crosslinked" refers to a three-dimensional polymeric network formed by the chemical bonds between at least two polymeric chains. This term includes pseudo-crosslinking resulting from ionic bonds or reinforcing physical interactions, for example. Thus, crosslinking can result from a wide variety of interactions, such as covalent bonds, ionic bonds, physical interactions, etc. Foamed adhesives may be used.

Thus, suitable elastomeric materials for use in the adhesive component are those that can be crosslinked and exhibit pressure sensitive adhesive properties either inherently or by compounding with commonly known tackifying resins. Typically, such crosslinkable pressure sensitive adhesive compositions include tackified natural rubbers, tackified block copolymers (e.g., styrene-isoprene-styrene, styrene-butadiene-styrene, and styrene-ethylene-butene-styrene block copolymers), tackified silicone elastomers, and inherently tacky materials such as poly(acrylates), poly(vinyl esters), and poly($\alpha$-olefins).

Poly(acrylates) are a preferred pressure sensitive adhesive. These poly(acrylates) are derived from alkyl acrylate and methacrylate monomers, which are specifically monofunctional unsaturated acrylate and methacrylate esters of nontertiary alkyl alcohols, the alkyl groups of which preferably have about 4-11 carbon atoms. Such acrylate monomers, when homopolymerized, generally have glass transition temperatures below about $-10°$ C. Examples of such monomers include, but are not limited to, those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof. Preferred poly(acrylates) can be prepared from acrylate monomers including those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Useful acrylic adhesives are described in U.S. Pat. No. 4,181,752 (Martens et al.), U.S. Pat. No. 4,303,485 (Levens), U.S. Pat. No. 4,619,979 (Kotnour et al.), U.S. Pat. No. 4,737,559 (Kellen et al.), U.S. Pat. No. 5,637,646 (Ellis), U.S. Pat. No. 5,804,610 (Hamer et al.), U.S. Pat. No. 5,641,567 (Brown) and U.S. Re24,906 (Ulrich), each incorporated herein by reference. A particularly useful adhesive comprises a crosslinked copolymer of 80-99 wt. % of a $C_6$-$C_{10}$ alkyl acrylate, such as hexyl or isooctyl acrylate, and 1-20 wt. % of acrylic acid.

Acrylate or methacrylate or other vinyl monomers which, as homopolymers, have glass transition temperatures higher than about $-10°$ C. may optionally be utilized in conjunction with one or more of the acrylate or methacrylate monomers provided that the glass transition temperature of the resultant polymer is below about $-10°$ C. and it has no melting point. Examples of vinyl monomers which, as homopolymers, have glass transition temperatures higher than about $-10°$ C. include, but are not limited to, tert-butyl acrylate, isobornyl acrylate, butyl methacrylate, vinyl acetate, acrylonitrile, and the like. These monomers can be used in various combinations.

Similarly, free radically copolymerizable amorphous polar monomers can also be employed, again provided that the glass transition temperature of the resultant polymer is below about $-10°$ C. Examples of useful polar monomers include, but are not limited to, acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacry-loxy-ethyl) ammonium propionate betaine, trimethylamine methacrylimide, 1,1-dimethyl-1-(2,3-dihydroxypropyl) amine methacrylimide, N-vinyl pyrrolidone, N-vinyl caprolactam, acrylamide, t-butyl acrylamide, dimethyl amino ethyl acrylamide, and the like. These monomers can be used in various combinations and in amounts such that the adhesive copolymer is not crystalline. Preferred polar monomers are those selected from the group consisting of monoolefinic monocarboxylic acids, monoolefinic dicarboxylic acids, acrylamides, N-substituted acrylamides, salts thereof, and mixtures thereof. Particularly preferred polar monomers are those selected from the group consisting of acrylic acid, methacrylic acid, N-vinyl pyrrolidone, and mixtures thereof.

Vinyl ester monomers suitable for use in the adhesive include, but are not limited to, those selected from the group consisting of vinyl 2-ethyl hexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids having about 1-14 carbon atoms which, as homopolymers, have glass transition temperatures below about −10° C. Preferred vinyl ester monomers are those selected from the group consisting of vinyl laurate, vinyl caprate, vinyl-2-ethyl hexanoate, and mixtures thereof.

A variety of methods are available to crosslink the adhesive component. Crosslinking can be imparted during the monomer polymerization through the use of copolymerizable multifunctional crosslinking agents that are capable of copolymerizing with the monomer mixture. The adhesive (co) polymer can also be crosslinked following polymerization using other multifunctional crosslinking agents, such as metal ions and peroxides, which are reactive with moieties present on the already-formed polymer chains, or through the use of ionizing radiation, such as electron beams. Whatever crosslinking means are used, crosslinking may be done after coating on the deformed backing.

Preferably, multifunctional crosslinking agents are used, particularly for the preferred acrylate (co)polymers and vinyl ester (co)polymers. The term "multifunctional" as used herein refers to crosslinking agents that possess two or more free radically polymerizable ethylenically unsaturated groups. Suitable multifunctional crosslinking agents include, but are not limited to, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol and hexanediol, triols such as glycerol, tetrols such as pentaerythritol, and mixtures thereof.

When such multifunctional crosslinking agents are used, one or more are used in an amount up to about 0.3 equivalent weight percent, preferably up to about 0.2 equivalent weight percent, more preferably up to about 0.15 equivalent weight percent, and most preferably up to about 0.1 equivalent weight percent, of the total polymerizable composition. Typically, no less than about 0.02 equivalent weight percent, of a multifunctional crosslinker should be present to provide sufficient crosslink density to support the primary shape. The "equivalent weight percent" of a given compound is defined as one hundred times the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight is the molecular weight).

Initiators can also be used to enhance the rate of polymerization and/or crosslinking Suitable free radical initiators include thermally activated initiators such as azo compounds, hydroperoxides, peroxides and the like, and photoinitiators. Photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives. The initiator is generally used in an amount ranging from about 0.01 percent up to about 10 percent by weight of the total polymerizable mixture, preferably up to about 5 percent.

The pressure sensitive adhesive are coated on the shape memory polymer backing using conventional coating techniques modified as appropriate to the particular backing. For example, these compositions can be applied to the deformed backing by methods such as roller coating, flow coating, dip coating, spin coating, spray coating knife coating, and die coating. These various methods of coating allow the adhesive to be placed on the backing at variable thicknesses thus allowing a wider range of use of the compositions. Coating thicknesses may vary. Generally, the coating is sufficient to coat the flattened projections and planar regions between projections of the backing, yet sufficiently thin that the recovered projections will extend through the adhesive layer when exposed to heat. In one embodiment the uncrosslinked adhesive is coated on the deformed backing and then crosslinked. In another embodiment the crosslinked adhesive is transferred to the deformed backing by lamination.

If desired, the backing layer may be surface treated to improve the adhesion of the adhesive layer. One useful means to improve the adhesion is in the use of special treatments to change the condition of a surface by increasing its surface energy. Surface treatments for increased surface energy include oxidizing pretreatments or the use of ink-receptive coatings. Oxidizing pre-treatments include the use of flame, ultraviolet radiation, corona discharge, plasma, chemical oxidizing agents and the like. Alternatively, polymeric primers for adhesives may be used to improve the bond with the adhesive layer.

FIG. 1 provides a schematic of the preparation and use of the debondable adhesive article. Backing 10 is provided with a pattern of projections 12, and has substantially planar areas 11 between the projections. Backing 10 is deformed to produce a substantially planer backing 20 having flattened projections 21. The deformed backing is provided with a pressure sensitive adhesive layer 31 on deformed backing 20 to provide the debondable adhesive article 30. As illustrated, the projections are latent—not discernable when coated with the adhesive. Article 30 may be adhered to a substrate 32 which is shown as article 40 having an adhesive layer 31 and the deformed backing layer 20. On the application of heat, article 50 debonds from the substrate 32. Projections 52 now extend through adhesive layer 31. As can be seen, the deformed substrate has recovered the original permanent shape wherein the projections 52 on the recovered backing 51 weakens the adhesive bond. In article 60, the substrate 32 is separated from the recovered adhesive article. When the article has recovered the original permanent shape, adhesive residue may remain on the tops of the projections and along the sides of the projections.

Figure 2:
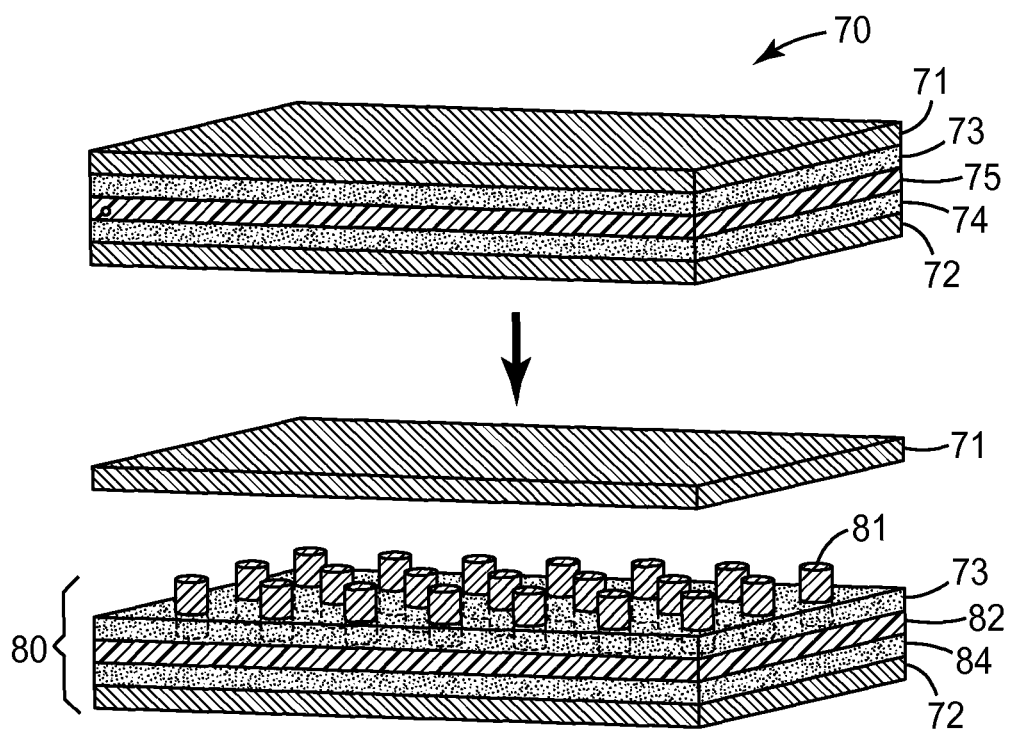
FIG. 2 is a cross section of the adhesive articles of Examples 2, 3, and 6-10.

FIG. 2 illustrates an alternate embodiment, where the debondable adhesive article is bonded to two substrates as illustrated by article 70. In article 70, a deformed backing layer 75 is provided having projections on one major surface only. The projections have been flattened, and the surface bearing the flattened projections has been coated with adhesive layer 73. The side not having projections has been coated with adhesive layer 74. The adhesive layers may be the same or different. The adhesive article has been adhered to substrates 71 and 72, which may be the same or different.

On the application of heat, the shape memory backing 82 recovers the original, permanent shape so the projections 81 now extend through adhesive layer 73. The top and sides of the now patent projections may have adhesive residue. Substrate 71 is thereby debonded. The second major surface of backing 82 lacks projections, so substrate 72 is not debonded.

With respect to FIG. 2, another embodiment is envisions wherein both major surfaces are provided with patterns of projections, coated with adhesive and provide debonding to both substrates. Additionally, but not illustrated, a debondable article comprising an additional foam layer is contemplated having the construction of a foam layer bonded between two backing layers.

The temperature for recovery of the projections and debonding of the film can vary from about room temperature to about 170° C., and preferably from about 50° C. to about 120° C. Methods of delivering the heat can include an oven, a heat gun, steam, microwave radiation, resistive heating, or induction heating. Resistive wires can be embedded in the tape to allow for resistive heating. Conductive susceptors such as fillers or films can be included in the tape to allow for induction heating. For example, a layer of aluminum foil can be included in the film and used for induction heating.

Figure 3:
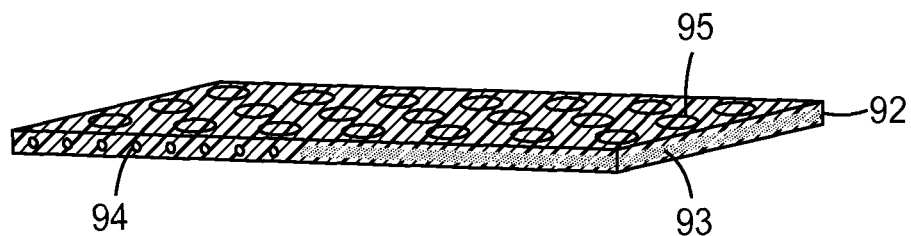
FIG. 3 is a view of the backing layer of the adhesive article illustrating the optional heating elements.

FIG. 3 illustrates the optional heating elements of the adhesive article. Shown is the deformed backing layer 92 with latent projections 95, optional conductive filler 93 and optional resistive heating element 94.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as poly(meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

The adhesive article may be subsequently debonded from the substrate by the application of heat. The original or permanent shape is recovered by heating the fastener above the $T_{trans}$ whereby the stresses and strains are relieved and the material returns to its original permanent shape having a pattern of patent projections. The projections on the surface of the adhesive article recover and exert force on the substrate to reduce the adhesive bond. In embodiments where the backing has two patterned surfaces of latent projections, and two adhesive layers coated thereon, the adhesive article may be bonded, and subsequently debonded from two substrates. In embodiments where the backing has one patterned surface of latent projections and one unpatterned surface, the article may be bonded to two substrates. Subsequently, the article may be debonded from the first substrate adhered to the pattern bearing surface, but remain adhered to the second substrate adhered to the unpatterned surface.

The original or permanent shape of the shape memory polymer backing can be recovered using a variety of energy sources. The adhesive article can be recovered using heat sources such as a hot air gun, hot plate, steam, conventional oven, infrared heater, radiofrequency ($R_f$) sources or microwave sources. Alternatively, the article (and associated adherends) be immersed in a heated bath containing a suitable inert liquid (for example, water or a fluorochemical fluid) that will not dissolve or swell the article and associated adherends in either it's cool or warm states.

In one embodiment, the adhesive article may further comprise a heating element, such as a resistive heating element encapsulated thereby. The resistive heating element may be in the form of wires. When debonding is desired, the resistive heating element may be connected to a source of electricity imparting heat to the bulk of the polymer, which raises the temperature above the $T_{trans}$ so the deformed article assumes the original permanent shape and effects debonding.

In other embodiments, the heating step may be an indirect heating step whereby the deformed polymer backing is warmed by irradiation, such as infrared radiation. As the responsiveness of the shape memory polymer is limited by the heat capacity and thermal conductivity, the heat transfer can be enhanced by the addition of conductive fillers such as conductive ceramics, carbon black and carbon nanotubes. Such conductive fillers may be thermally conductive and/or electrically conductive. With electrically conductive fillers, the polymer may be heated by passing a current therethough. In some embodiments, the shape memory polymer may be compounded with conductive fillers, and the polymer heated inductively by placing it in an alternating magnetic field to induce a current in the conductive filler. One useful method of inductively heating the polymeric backing is described in U.S. Pat. No. 6,849,837 (Reiss et al.), incorporated herein by reference.

EXAMPLES

Preparatory Example 1

Preparation of W Catalyst Solution

An oven-dried 500 mL flask under nitrogen was charged with $WCl_6$ (2.00 g, 0.005 mol, Sigma-Aldrich, St. Louis, Mo.), and about 100 mL of toluene (anhydrous, Sigma-Aldrich). This mixture was stirred for one hour while purging with nitrogen. Nonylphenol (1.1 g, 0.005 mol, Sigma-Aldrich) was added via syringe and the solution was stirred for four hours with a nitrogen purge. Using a syringe, 2,4-pentanedione (0.77 g, 0.008 mol, Acros Organics) was then added, and the solution was stirred for 17 h with a nitrogen purge. Anhydrous dicyclopentadiene (250 mL, 1.84 mol, containing 4% ethylidene norbornene, TCI America) was added. The flask was heated to 60° C. and vacuum was applied to remove the toluene (and other volatiles including some dicyclopentadiene). An additional 106 mL of dicyclopentadiene was added to bring the total weight of the solution to 247 g, followed by an additional charge of 2,4-pentanedione (0.77 g, 0.008 mol).

Preparatory Example 2

Reactive Resin Formulation—20% Santicizer 261a

Mixture A

An oven-dried, nitrogen purged flask was charged, by syringe, with dicyclopentadiene (14.9 mL), followed by ethyl trichloroacetate (0.15 mL) and 5 mL of the catalyst solution from Preparatory Example 1.

Mixture B

Irganox 1010 (0.37 g, Ciba Specialty Chemical Corp) was placed in an oven-dried, nitrogen purged flask, followed by dicyclopentadiene (9.8 mL) and Santicizer 261a (8 mL), then 1.9 ml, of a 10 vol % solution of diethylaluminumchloride (Sigma-Aldrich) in dicyclopentadiene was then added.

Preparatory Example 3

Reactive Resin Formulation—10% Santicizer 261a

Mixture A

An oven-dried, nitrogen purged Erlenmeyer flask was charged, by syringe, with dicyclopentadiene (66.9 mL), ethyl trichloroacetate (0.62 mL) and 22.5 mL of the catalyst solution from Preparatory Example 1.

Mixture B

Irganox 1010 (1.71 g) was placed in an oven-dried, nitrogen purged flask, followed by dicyclopentadiene (61.9 mL) and Santicizer 261a (18 mL), then 8.4 mL of a 10 vol % solution of diethylaluminumchloride in dicyclopentadiene.

Example 1

Mold Preparation 40 pieces of copper wire with a 0.04" (0.1 mm) diameter and nominally 5" (127 mm) long were taped to a 1"×6"×6" polypropylene block (~25×152×152 mm). The average spacing between the centers of the wires was 0.13" (3.3 mm). The assembly was placed in a press heated to 138° C., compressed, and cooled. The wires were removed to leave rounded channels 0.01" deep (~0.25 mm). A spacer made from a 0.03" thick (~0.76 mm) polypropylene sheet with a rectangular opening 4"×4" (~101×101 mm) was placed over the patterned polypropylene mold, and a piece of glass placed over the spacer.

Sample Preparation:

Equal volumes of Mixture A and Mixture B from Preparatory Example 2 were injected through a static mixer and into the mold via a hole in the glass. The filled mold was placed in a 110° C. oven for 10 minutes, during which time the resin cured. The resulting cured polymer samples were removed from the mold and postcured in a 110° C. oven for an additional 10 minutes. Strips of the sample were cut to 1"×4" (~25×101 mm). The cured shape memory polymer backing having the permanent shaped was a substantially planar film having a series of parallel ribs, the ribs semicircular in cross section.

Individually, these strips were placed between 3/8" thick (~9.5 mm) steel plates which were bolted together. This assembly was heated for 30 minutes in 110° C. oven, and the bolts were tightened uniformly to compress the film. The tightened assembly was then cooled and the rib pattern on the resulting polymer film was flattened. The samples were cleaned with isopropanol wipes.

The monomer components of 87.5 parts isooctyl acrylate, 12.5 parts acrylic acid, 0.2 parts hexane diol diacrylate and 0.2 parts IRGACURE 651 (all by weight) were mixed in a 40 ml plastic cup. Using a knife coater, the mixtures were coated to a thickness of about 50 micrometers (~2-3 mils) between the flattened polymer film and a release liner. The resulting coatings were polymerized using ultraviolet radiation from an LED array with a peak emission of 375 nm for 1 minute (about 3000 millijoules/cm²) and thereafter tested under conditions of about 23° C. and 50% relative humidity These coated strips were then exposed to a 375 nm LED array for 1 minute through the liner to provide a cured adhesive on the deformed shape memory polymer backing. The strips were cut to ½" wide (12.7 mm). A ½" wide piece of 3M Double Coated Urethane Foam Tape 4008 (0.12" thick, 3 mm) was then laminated to the unpatterned side of the shape memory polymer backing Peel Testing:

The release liner was removed from the photocured adhesive layer on the ½" wide strips described above. The adhesive was then applied to a steel coupon measuring 1"×6"×0.01" (~25×152×0.26 mm). The release liner was then removed from the urethane foam tape, the foam tape was applied to an aluminum substrate measuring 1"×6"×0.005" (~25×152×1.3 mm). The samples were left in an environment of 23° C. and 50% relative humidity overnight. The free ends of the steel and aluminum coupons were each clamped in the pneumatic grips of an Instron Model 4501 load frame. The grips were then separated at 12"/min to provide a T-peel test of the adhesive. The T-peel force was averaged over 6" (15 cm) of displacement of the grips. The average peel force for these two pre-activated samples was 42 oz/inch-width, and they failed by splitting the foam.

Two additional samples were heated in a 110° C. oven for 15 minutes, and the ribs in the shape memory polymer recovered the permanent shape during the heating cycle. One sample completely debonded in the oven at the adhesive/steel interface. After cooling, the second sample was tested at 12"/min (305 mm/min), and showed an average peel force of 10 oz/inch-width. It failed by adhesive failure at the adhesive/steel interface, indicative of debonding.

Example 2

Mold Making

A master pattern was generated using a square lattice of 0.04" diameter (~1 mm) steel posts embedded in a polycarbonate block. The posts were spaced 0.12" ~3 mm) from center to center. In one master, the posts protruded 0.05" (1.27 mm) above the polycarbonate surface, and in the other master, the posts protruded 0.02" 0.51 mm) above the polycarbonate surface. These master patterns were placed against a 1"×6"×6" (25×152×152 mm) polypropylene block. The assembly was placed in a press heated to 143° C., compressed, and cooled. The master patterns were then removed to leave a negative pattern of cylindrical holes on the surface of the polypropylene molds. Layers of tape with variable thicknesses were applied to the perimeter of the pattern on the molds to act as spacers.

Sample Preparation:

In a nitrogen-filled glove bag, equal volumes of Mixture A and Mixture B from Preparatory Example 3 were injected through a static mixer onto the surface of the polypropylene mold. A vacuum was applied for 30 seconds to help fill the mold. A steel plate heated on an 80° C. hot plate was then placed on the tape spacers, and the resin was allowed to cure for several minutes between the steel plate and the patterned polypropylene surface. The samples were then removed the from the glove bag, demolded, and post-cured for 10 minutes in a 110° C. oven. The resulting shape memory polymer backing had a pattern of cylindrical posts on the surface.

The patterned film samples nominally 1.2"×2.2" (30.5×55.8 mm) were pressed with 38,000 lbs force (169 kN) in a Carver press heated to 100° C. The press was cooled while still applying pressure. The cylindrical posts of the deformed shape memory backing were flattened. The deformed backing samples were cleaned with isopropanol wipes.

The monomer components of 95 parts isooctyl acrylate, 5 parts acrylic acid, 0.2 parts hexanediol diacrylate and 0.2 parts IRGACURE 651 (all by weight) were mixed in a 40 ml plastic cup. Using a knife coater, the mixtures were coated (to a thickness indicated in Table 1) between the flattened polymer film and a release liner. The resulting coatings were polymerized using ultraviolet radiation from an LED array with a peak emission of 375 nm for 1 minute (about 3000 millijoules/cm$^2$). 3M VHB Tape 4910 (0.04" thick) was then laminated to the unpatterned side of the shape memory polymer films.

Different combinations of backing thickness, post height, and adhesive thickness were tested, and those dimensions are described in Table 1.

Normal Tensile Testing:

The test substrates were T-shaped pieces of aluminum with a base having an area 1"×2.5" (25.4×63.5 mm). Two such samples were adhered together using 1"×0.5" (25.4×12.7 mm) sample of the above-described adhesive coated backings. The samples were left in an environment of 23° C. and 50% relative humidity overnight. The specimens were then heated in a 120° C. oven for 15 minutes, during which time the pattern of posts on the shape memory polymer film recovered the permanent shape. After cooling, they were tested in a normal tensile mode at a rate of 0.2"/minute and at room temperature. The samples failed at the interface between the aluminum and the photocured adhesive, indicating debonding. A control test was done with an analogous three-layer construction in which the shape memory polymer film was unpatterned and the sample had not been heated. The normal tensile adhesion of the samples after the heat treatment was divided by the adhesion in the unpatterned control test to give a percent of remaining adhesion. The data for each sample is the average of three specimens.

surface of the steel mold. A glass plate was then placed on the tape spacers, and the resin was allowed to cure for several minutes between the patterned steel plate and the glass. The samples were then removed the from the glove bag, demolded, and post-cured for 10 minutes in a 110° C. oven. The resulting samples were polymer films with a thickness of about 0.6 mm and an array of cylindrical posts with a diameter of 1.6 mm.

The samples were pressed with 38,000 lbs force (169 kN) in a Carver press heated to 116° C. The press was cooled while still applying pressure. The films were then essentially flat with the thickness shown in Table 2.

The monomer components of 95 parts isooctyl acrylate, 5 parts acrylic acid, 0.2 parts hexanediol diacrylate and 0.2 parts IRGACURE 651 (all by weight) were mixed in a 40 ml plastic cup. Using a knife coater, the mixtures were coated (to a thickness indicated in Table 2) between the flattened polymer film and a release liner. The resulting coatings were polymerized using ultraviolet radiation from an LED array with a peak emission of 375 nm for 1 minute (about 3000 millijoules/cm$^2$).

The samples were cut to 1"x0.5" (24.4×12.7 mm) pieces and cleaned with isopropanol wipes. 3M VHB Tape 4910 (0.04" thick, 1 mm) was then laminated to the unpatterned side of the shape memory polymer backing Normal Tensile Testing:

The test substrates were T-shaped pieces of aluminum with a base having an area 1"×2.5" (25.4×63.5 mm). Two such

TABLE 1

Normal Tensile Adhesion Using Patterned Shape Memory Carrier

| Sample | Backing Thickness (mils/mm) | Post Height (mils/mm) | Adhesive Thickness (mils/mm) | Normal Tensile Strength After Heat (psi/kPa) | Adhesion Remaining (%) |
|---|---|---|---|---|---|
| unpatterned film | 11/.28 | 0 | 8/.2 | [62/427]$^a$ | 100% |
| 2A | 34/.86 | 48/1.2 | 10/.25 | 19/131 | 31% |
| 2B | 51/1.3 | 48/1.2 | 9/.23 | 23/158 | 37% |
| 2C | 25/.63 | 17/.43 | 1/.02 | 41/283 | 66% |
| 2D | 48/1.2 | 48/1.2 | 2/.05 | 1/7 | 2% |
| 2E | 28/.71 | 48/1.2 | 3/.08 | 34/234 | 55% |
| 2F | 19/.48 | 15/.38 | 3/.08 | 59/407 | 95% |

$^a$This control data for the unpatterned film is for specimens that had not been heated Example 3

Mold Making

The patterned surface of the polymer backing was prepared using a perforated steel sheet with round holes (0.0625", 1.6 mm diameter) in a staggered 0.125" lattice (3.18 mm). A 6"×12" (152×304 mm) piece of the sheeting was adhered with 3M DP100 epoxy to a 6"×12" hot rolled 0.25" thick steel plate (6.35 mm). Two molds were made—one with a perforated sheet that was 0.060" thick (1.5 mm) and one that was 0.036" thick (0.9 mm). Strips of tape were added to the mold as spacers. The molds were sprayed with a silicone release agent before use.

Sample Preparation:

In a nitrogen-filled glove bag, the molds described above were heated on a 100° C. hotplate until warm to the touch. Equal volumes of Mixture A and Mixture B from Preparatory Example 3 were injected through a static mixer onto the samples were adhered together using 1"×0.5" (25.4×12.7 mm) sample of the above-described adhesive coated backings.

Six identical specimens were made for both sample 3A and sample 3B. The specimens were left in an environment of 23° C. and 50% relative humidity for 72 hours. A subset of three specimens from both samples was then heated in a 120° C. oven for 10 minutes during which time the post pattern recovered. After cooling, all the specimens (both those that had been heated and those that had not been heated) were tested in a normal tensile mode at a rate of 2.0"/minute and at room temperature. All the specimens failed at the interface between the aluminum and the photocured adhesive. The resulting average normal tensile strengths are shown in Table 2. The percent of remaining adhesion was calculated by dividing the normal tensile adhesion of the samples that had been heat treated by the adhesion of the samples that were not heat treated.

TABLE 2

Normal Tensile Adhesion Using Patterned Shape Memory Carrier Films

| Sample | Backing Thickness (mils/mm) | Post Height (mils/mm) | Pressed Thickness (mils/mm) | Adhesive Thickness (mils/mm) | Normal Tensile Before Heat psi (kPa) | Normal Tensile After Heat Psi (kPa) | Adhesion Remaining (%) |
|---|---|---|---|---|---|---|---|
| 3A | 26/.67 | 28/.71 | 28/.71 | 5/.13 | 78 ± 4 (538) | 13 ± 6 (90) | 17% |
| 3B | 24/.61 | 47/1.2 | 31/.79 | 3/.07 | 85 ± 7 (586) | 25 ± 8 (172) | 29% |

Example 4

A 6"×6"×0.06" (152 mm×152 mm×1.5 mm) aluminum plate was provided with a 2.25" (57 mm) circular hole. An additional 6"×6"×0.06" (152 mm×152 mm×1.5 mm) aluminum plate was provided with a hexagonal array of holes machined through the plate. The holes had a diameter of approx 0.06" (1.5 mm), and were tapered along the depth. The array was concentric hexagonal rings of 30, 24, 18, 12, 6 and 1 holes with the holes spaced 0.18" (~4.6 mm) on center. The two plates were placed against each other, assuring that wider end of the tapered holes was on the same face that contacted the other aluminum plate. A release liner, a 0.06" (1.6 mm) silicone sheet, and a 0.25" (6.4 mm) aluminum plate were placed against the other face of the plate with tapered holes to seal the holes on that face.

14 inches (35.6 cm) of stainless steel wire (0.011" diameter, ~0.28 mm) was bent into a sinusoidal shape such that it would fit within the 2.25" disk.

A monomer solution was prepared by adding 1.0% pentaerythritol tetrakis(3,5-di-tert-butyl-4-hydroxycinnamate) (Sigma Aldrich) and 0.5% carbon black (Alfa Aesar) to an 80/20 v/v mixture of dicyclopentadiene (TCI) and hexylnorbornene. A catalyst solution was prepared from 0.010 g tricyclohexyphosphine (Aldrich) and 0.10 g of Grubbs First Generation catalyst (Aldrich) in 2 mL of toluene.

A portion of the monomer solution (10 mL) was stirred in a 0° C. ice bath. A portion of the catalyst solution (0.15 mL) was added to the monomer solution and was mixed for about 5 seconds. The catalyzed solution was transferred to the mold and degassed under vacuum, embedding the wire within the monomer solution. A top plate of polydicyclopentadiene (3"×3"×0.06", ~76×76×1.5 mm) was placed over the open mold and pressed down to expel excess monomer. The mold was placed in a 50° C. oven for 30 minutes. The part was then demolded and postcured for 15 minutes in a 130° C. oven. The polydicyclopentadiene plate on the top of the part was then trimmed to a circle with a diameter of 2.6". The ends of the wire were also pulled out of the polymer to expose them as leads.

The disk was then pressed flat in a Carver press for 30 seconds at room temperature with 24,000 lbf (106 kN). After removing the disk from the press, the posts on the disk remained in their flattened state.

A 0.03" (0.76 mm) thick polypropylene sheet with a hexagonal opening matching the size of the array of posts was placed over the flattened polymer sheet. The monomer components of 95 parts isooctyl acrylate, 5 parts acrylic acid, 0.1 parts hexanediol diacrylate and 0.14 parts IRGACURE 651 (all by weight) were mixed in a 40 ml plastic cup and then charged into the cavity created by the polypropylene mold. A release liner and glass plate were placed over the monomer components, and they were polymerized using ultraviolet radiation from an LED array with a peak emission of 375 nm for 7 minutes (about 20,000 millijoules/cm$^2$).

The disk was then adhered to a glass plate (4"×3.5"×0.18", 101×89×4.6 mm). The leads of the wire in the disk were connected to a 12 V sealed lead acid battery. The sample became warm, and after 3 minutes of current, the edges of the disk were visibly debonding from the glass as posts were recovering from the disk and pushing the disk debonding from the glass. At that point, the glass cracked in two places. After three additional minutes of current, the adhesive was completely debonded from the glass except where the posts had pushed the adhesive against the glass. The disk was then easily removed from the glass.

Example 5

40% HexNB Formulation (151313-103)

The same mold comprising a hexagonal array of holes was used. 24" (61 cm) of 0.011" diameter stainless steel wire was bent was bent into a sinusoidal shape such that it would fit within the 2.25" disk.

A monomer solution was prepared by adding 1.0% pentaerythritol tetrakis(3,5-di-tert-butyl-4-hydroxycinnamate) (Sigma Aldrich) and 0.5% carbon black (Alfa Aesar) to a 60/40 v/v mixture of dicyclopentadiene (TCI) and hexylnorbornene. A catalyst solution was prepared from 0.010 g tricyclohexyphosphine (Aldrich) and 0.10 g of Grubbs First Generation catalyst (Aldrich) in 2 mL of toluene.

A portion of the monomer solution (10 mL) was stirred in a 0° C. ice bath. A portion of the catalyst solution (0.15 mL) was added to the monomer solution and was mixed for about 5 seconds. The catalyzed solution was transferred to the mold and degassed under vacuum. The wire was then embedded within the monomer solution. A top plate of polydicyclopentadiene (3"×3"×0.06") was placed over the open mold and pressed down to expel excess monomer. The mold was placed in a 50° C. oven for 30 minutes. The part was then demolded and postcured for 15 minutes in a 130° C. oven. The polydicyclopentadiene plate on the top of part was then trimmed to a circle with a diameter of 2.6". The ends of the wire were also pulled out of the polymer to expose them as leads. The disk was then heated in an 80° C. oven for 4 minutes. It was then immediately pressed flat in a Carver press for 30 seconds at room temperature with 40,000 lbf (178 kN). After removing the disk from the press, the posts on the disk remained in their flattened state. A piece of 0.04" (1 mm) thick foam tape was cut into a hexagon with 0.9" (23 mm) sides and attached over the flattened post pattern using Scotch-Weld CA8 instant adhesive.

One such disk was then adhered to natural polypropylene. The disk was left on the polypropylene for 16 hours. The leads of the wire in the disk were then connected to a 12 V sealed lead acid battery, and the sample became warm. After 214 seconds of current, the disk fell off the polypropylene substrate without leaving any noticeable adhesive on the polypropylene. Another identical disk was adhered to polypropylene and left for 16 hours. The assembly was then placed in a 130° C. oven for 15 minutes. Upon removal from the oven, the disk fell off the substrate.

Example 6

A 6"×6"×0.020" (152 mm×152 mm×0.51 mm) stainless steel sheet was provided with a staggered array of 119 holes with a 0.06" in diameter and spaced 0.18" (4.6 mm) apart (center to center). The holes covered an area of 1"×3.25". An additional aluminum sheet 6"×6"×0.025" (152 mm×152 mm×0.64 mm) was provided with a 1"×3.25" (25×83 mm) rectangular opening, and it was positioned on top of the perforated stainless steel sheet. A polyester film and a 6"×6"× 0.25" (152×152×6.4 mm) aluminum plate were placed beneath the perforated stainless steel sheet to seal one end of the holes.

Pentaerythritoltetrakis(3,5-di-tert-butyl-4-hydroxyhydrocinnamate) (0.067 g, Sigma-Aldrich) was dissolved in a solution of dicyclopentadiene (6.4 g, TCI America) and 5-ethylidene-2-norbornene (0.3 g, Acros) and then cooled in a 0° C. bath. A solution of tricyclohexylphosphine (0.00025 g, Sigma-Aldrich) and First Generation Grubbs' Catalyst (0.0025 g, Sigma-Aldrich) in toluene (0.050 mL) was added.

The solution was immediately transferred to the surface of the mold made from the aluminum sheets. A plate of glass was placed over the solution in the mold. The sample was allowed to cure in a 100° C. oven for 20 minutes. It was then removed from the mold to give a flat sheet 1" wide, 3.25" long, and about ~0.03" thick (~25×83×0.8 mm) and with a pattern of posts 0.020" high (0.51 mm). The patterned sheet was post-cured in a 130° C. oven for 10 minutes.

The sheet was placed between aluminum plates and heated in a 140° C. oven for 10 minutes. The assembly of the sheet and plates was immediately placed in a Carver press, and 45,000 lbf (200 kN) was applied for one minute. The sheet was then substantially flat and between 0.029" and 0.035" thick.

The monomer components of 75.3 parts isooctyl acrylate, 4 parts acrylic acid, 20 parts isobornyl acrylate, 0.5 parts hexanediol diacrylate and 0.2 parts IRGACURE 651 (all by weight) were mixed in a 100 ml plastic cup. Using a knife coater, the mixtures were coated to about 0.004"-0.005" (0.10 mm-0.13 mm) between each face of the polymer film and a release liner. The resulting coatings were polymerized under a bank of two blacklight bulbs for 30 minutes (about 3300 millijoules/cm$^2$) on each face.

Five pieces were cut to 1"×0.5" (25×12.7 mm) and each applied to two 1"×4" (25.4×101 mm) steel coupons to make overlap joints. One of these samples was pulled apart at 2"/min and gave a peak load of 24 lbf (106N). The other four samples were heated in a 140° C. oven for 10 minutes. In the oven, the post pattern reappeared on the film. Two of the samples became completely debonded in the oven and could not be tested. The other two samples were pulled apart under shear at 2"/min and showed peak loads of 12.8 lbf and 14.8 lbf (57 and 66N).

Example 7

The same mold comprising a rectangular array of holes was used.

The procedure used in Example 6 was repeated, but the monomer formulation was pentaerythritol tetrakis(3,5-di-tert-butyl-4-hydroxyhydrocinnamate) (0.067 g, Sigma-Aldrich) in a solution of dicyclopentadiene (0.6 g, TCI America) and 5-ethylidene-2-norbornene (5.6 g, Acros). One overlap shear specimen on steel was tested without heating, and gave a peak load of 9.3 lbf (41.3N). Four other samples were heated in a 140° C. oven for 10 minutes. In the oven, the post pattern reappeared on the film. Two of the samples became completely debonded and could not be tested. The other two samples were pulled apart under shear at 2"/min and showed peak loads of 16.2 lbf and 7.5 lbf (72 and 33N).

Example 8

The same mold comprising a rectangular array of holes was used.

The procedure used in Example 6 was repeated, but the monomer formulation was pentaerythritol tetrakis(3,5-di-tert-butyl-4-hydroxyhydrocinnamate) (0.067 g, Sigma-Aldrich) in a solution of dicyclopentadiene (0.3 g, TCI America) and 5-ethylidene-2-norbornene (5.9 g, Acros). One overlap shear specimen on steel was tested without heating, and gave a peak load of 23.6 lbf (105N). Four other samples were heated in a 140° C. oven for 10 minutes. In the oven, the post pattern reappeared on the film. Three of the samples became completely debonded and could not be tested. The other sample was pulled apart under shear at 2"/min and showed a peak load of 14.7 lbf (65N).

Example 9

The same mold comprising a rectangular array of holes was used.

The procedure used in Example 6 was repeated, but the monomer formulation was pentaerythritol tetrakis(3,5-di-tert-butyl-4-hydroxyhydrocinnamate) (0.067 g, Sigma-Aldrich) in a solution 5-ethylidene-2-norbornene (6.2 g, Acros). One overlap shear specimen on steel was tested without heating, and gave a peak load of 20.7 lbf (92N). Four other samples were heated in a 140° C. oven for 10 minutes. In the oven, the post pattern reappeared on the film. One of the samples became completely debonded and could not be tested. The other three samples were pulled apart under shear at 2"/min and showed peak loads of 14.7 lbf, 17.6 lbf, and 7.1 lbf.

Example 10

A 6"×6"×0.01" (152 mm×152 mm×0.25 mm) stainless steel sheet was provided with a staggered array of 116 holes with a 0.06" in diameter and spaced 0.18" apart (center to center). The holes covered an area of 1"×3.25". An additional stainless steel sheet 6"×6"×0.005" (152 mm×152 mm×0.13 mm) was provided with a 1"×3.25" rectangular opening, and it was positioned on top of the perforated Al sheet. A polyester film and a 6"×6"×0.25" aluminum plate were placed beneath the perforated aluminum sheet to seal one end of the holes.

Pentaerythritoltetrakis(3,5-di-tert-butyl-4-hydroxyhydrocinnamate) (0.069 g, Sigma-Aldrich) was dissolved in a solution of dicyclopentadiene (4.0 g, TCI America) and 5-hexyl-2-norbornene (2.4 g). A solution of tricyclohexylphosphine (0.0005 g, Sigma-Aldrich) and First Generation Grubbs' Catalyst (0.005 g, Sigma-Aldrich) in toluene (0.10 mL) was added.

The solution was immediately transferred to the surface of the mold made from the aluminum sheets. A plate of glass was placed over the solution in the mold. The sample was allowed to cure in an 80° C. oven for 15 minutes. It was then removed from the mold to give a flat sheet 1" wide, 3.25" long, and about 0.007" thick (~25×83×0.18 mm) and with a pattern of posts 0.010" high (0.25 mm). The patterned sheet was postcured in a 120° C. oven for 10 minutes. The sheet was placed between Al plates and heated in an 80° C. oven for 10 minutes. The assembly of the sheet and plates was immediately placed in a Carver press, and 40,000 lbf (178 kN) was applied for one minute. The sheet was then substantially flat and about 0.009" thick (0.23 mm).

The monomer components of 75.3 parts isooctyl acrylate, 4 parts acrylic acid, 20 parts isobornyl acrylate, 0.5 parts hexanediol diacrylate and 0.2 parts IRGACURE 651 (all by weight) were mixed in a 40 ml plastic cup. Using a knife coater, the mixtures were coated to about 0.002" (0.05 mm) between each face of the polymer film and a release liner. The resulting coatings were polymerized under a bank of two blacklight bulbs for 30 minutes (about 3300 millijoules/cm$^2$) on each face.

Two pieces were cut to 0.93"×0.75" (24×19 mm). The patterned face of the each sample was applied to a stainless steel coupon, and the other face was applied to a strip of anodized aluminum 0.004" thick (17.8 mm). One of these samples was placed in a 100° C. oven for 10 min, during which time the post pattern reemerged, and it fell off the stainless steel without leaving residue. The other sample was hung under static shear (1 kg weight) in an environment of 23° C. and 50% relative humidity. After 42,000 minutes, the sample was still unchanged. The weight was removed, and the sample was placed in a 100° C. oven for 30 min, during which time the pattern of posts clearly reemerged. After cooling, it was re-hung under static shear with a 1 kg weight. In less than one minute, the film debonded cleanly from the stainless steel.

Four pieces of the film were cut to 3"×0.5" (76×12.7 mm). The patterned face of each strip was applied to glass, and other face was applied to anodized aluminum tape, 0.004" thick. Two of these samples were allowed to rest for 1 hour and then tested under 180° peel at 12"/min (~305 cm/min) for 5 seconds. The median peel force was 50 lbf (222 N) per inch width. The remaining two samples were heated in a 90° C. oven for 30 minutes, during which time the post pattern reemerged in most parts of the samples. After cooling, similar 180° peel tests were done, and the median peel value was 23 lbf per inch width (102 N).

Example 11

The mold from Example 6 comprising a rectangular array of holes was used. A 1"×3.25"×0.001" (25 mm×83 mm×0.025 mm) piece of aluminum foil was provided with small holes (~1 mm diameter) spaced 0.5 cm apart in a grid pattern.

A monomer solution was prepared by adding 1.0% pentaerythritol tetrakis(3,5-di-tert-butyl-4-hydroxycinnamate) (Sigma Aldrich) to a 60/40 v/v mixture of dicyclopentadiene (TCI) and hexylnorbornene. A catalyst solution was prepared from 0.010 g tricyclohexyphosphine (Aldrich) and 0.10 g of Grubbs First Generation catalyst (Aldrich) in 2 mL of toluene.

A portion of the monomer solution (7 mL) was mixed with a portion of the catalyst solution (0.1 mL), and most of the catalyzed solution was immediately transferred to the surface of the mold. The perforated aluminum foil was then placed over the monomer solution in the mold, and the remaining monomer solution was transferred to the top surface of the perforated aluminum foil. A plate of glass was placed over the mold. The sample was allowed to cure in a 100° C. oven for 20 minutes. It was then removed from the mold to give a sheet 1"×3.25"×~0.03" thick (~25×83×0.8 mm) and with a pattern of posts 0.020" high (0.51 mm). The aluminum foil was embedded within the polymer film. The patterned sheet was postcured in a 130° C. oven for 10 minutes.

The sheet was placed between aluminum plates and heated in a 100° C. oven for 10 minutes. The assembly of the sheet and plates was immediately placed in a press at room temperature, and 45,000 lbf (200 kN) was applied for one minute. The sheet was then substantially flat.

The sample was cut into smaller pieces 0.5"×1.0" (13 mm×25 mm). PSA transfer tape (300 LSE adhesive transfer tape, 0.13 mm thick from 3M) was laminated to both faces of the samples. These samples were then each laminated to the ends of two 1"×4"×0.125" (25 mm×102 mm×3.2 mm) polypropylene coupons to make overlap shear specimens. Four specimens were made, and they were allowed to rest for 30 minutes in an environment of 23° C. and 50% r.h. Two specimens were then pulled apart under shear at 2"/min (52 mm/min) using a Syntech load frame with self-tightening grips, and the peak loads for these two control specimens were 18.1 and 15.0 lbf (80.5 and 66.7 N). The other two specimens were placed under a Kool Glide Pro induction heater and treated using the "transverse" setting for 24 seconds, during which time the post pattern reemerged. After cooling, these treated specimens were similarly tested under shear, and the peak loads observed were 3.1 lbf and 10.0 lbf (13.8 and 44.5 N).

Example 12

The 6"×6"×0.020" (152 mm×152 mm×0.5 mm) stainless steel sheet from Example 6 was placed under a 6"×6"×0.015" (152 mm×152 mm×0.38 mm) stainless steel sheet with a 1"×3.25" (25 mm×83 mm) rectangular opening. A ~1"×~3"× ~0.04" (25 mm×75 mm×1 mm) sheet of DIARY MM3520 polyurethane shape memory polymer (SMP Technologies, Japan) was then placed on the rectangular opening. The 6"×6"×0.010" (152 mm×152 mm×0.25 mm) stainless steel sheet from Example 10 was placed above the DIARY polymer sample. Polyester films and aluminum plates were then placed over the top and bottom of this assembly, and it was placed in a hot press at 190° C. After heating for 2 minutes, 40,000 lbf was applied with the press, and the press was allowed to cool slowly to less than 160° C. The sample was demolded and then comprised a 1"×3.25"×0.015" (25 mm×83 mm×0.4 mm) polyurethane sheet with a pattern of 0.020" (0.5 mm) posts on one face and a pattern of 0.010" (0.25 mm) posts on the other face.

The sample was placed between aluminum plates in a 100° C. oven for 10 min, and then immediately pressed at room temperature with 20,000 lbf and allowed to cool to room temperature. The sample was then substantially flat. PSA transfer tape (300 LSE adhesive transfer tape, 0.13 mm thick from) was laminated to both faces of the sample. The sample was cut into 1.0"×0.5" (25 mm×13 mm) pieces and used to make normal tensile test specimens on aluminum substrates as described in Example 2. Six specimens were made, and they were allowed to rest for 30 minutes in an environment of 23° C. and 50% r.h. Three of these samples were then tested in a normal tensile mode at a rate of 2"/min (51 mm/min) and the peak loads observed were 22.5, 27.4, and 26.6 lbf (100.1, 121.9 and 118.3 N). All three samples left significant adhesive residue on the aluminum substrate.

The other three samples were heated in a 50° C. oven for 20 minutes. After cooling to room temperature, they were tested under the same normal tensile conditions, and peak loads of 12.2, 17.9, and 12.8 lbf (54.3, 79.6, and 56.9 N) were observed. All three samples debonded at the interface of the aluminum and face of the DIARY film with the 0.020" (0.5 mm) posts. The adhesive remained on the DIARY face and left no visible residue on the aluminum substrate. The DIARY film was then removed by hand from the remaining aluminum substrate (i.e., debonded from the face with the 0.010" (0.25 mm) post pattern), and nearly all the adhesive remained bonded to the DIARY film.

Three analogous control samples were also made using unpatterned DIARY MM3520 films ~0.025" (0.64 mm) thick. These control samples were heated in a 50° C. oven for 20 minutes. After cooling to RT, they were tested under the same normal tensile conditions, and peak loads of 24.1, 17.2, and 23.8 lbf (107.2, 76.5, and 105.9 N) were observed. Most of the adhesive remained on the aluminum substrate rather than on the DIARY film.

The invention claimed is:

1. A debondable adhesive article comprising:
    a) a shape memory polymer backing having a first surface and a second surface and having a temporary, deformed shape and pattern of latent projections on the first surface thereof; and
    b) an amorphous pressure sensitive adhesive layer coated on patterned surface of the shape memory polymer backing wherein the amorphous adhesive layer has no crystallinity;
    wherein on exposure to heat the backing layer recovers to a permanent shape having a pattern of patent surface projections.

2. The debondable adhesive article of claim 1 wherein the shape memory polymer of the backing is a crosslinked thermoset polymer.

3. The debondable adhesive article of claim 2 wherein the crosslinked thermoset polymer is a dicyclopentadiene copolymer.

4. The debondable adhesive article of claim 1 wherein the shape memory polymer is a crystalline thermoplastic polymer.

5. The debondable adhesive article of claim 1 further comprising
    a) a pattern of latent projections on the second surface of the backing; and
    b) an amorphous pressure sensitive adhesive layer coated on the second surface of the shape memory polymer backing.

6. The debondable adhesive article of claim 1 wherein the pattern of latent projections comprise solid three and four-sided pyramids, truncated pyramids, cones, cylinders, straight lines, wavy lines, square or rectangular blocks, and hemispheres.

7. The debondable adhesive article of claim 1 wherein the article further comprises a resistive heating element embedded therein.

8. The debondable adhesive article of claim 1 wherein the depth of the projections is 0.01" to 0.05" (0.25 to 1.27 mm).

9. The debondable adhesive article of claim 1 wherein on exposure to heat the backing layer recovers to a permanent shape and the projections extend through the adhesive coated surface.

10. The debondable adhesive article of claim 1 further comprising an amorphous pressure sensitive adhesive layer coated on the second surface of the backing.

11. The debondable adhesive article of claim 1 wherein the article further comprises an induction heating element embedded therein.

12. A method of preparing the debondable adhesive article of claim 1 comprising:
    a) providing a shape memory polymeric backing having a temporary, deformed planar shape and latent projections on the first surface of thereof, and
    b) providing the first surface of the backing with an amorphous pressure sensitive adhesive layer.

13. The method of claim 12 wherein the adhesive is coated on the backing.

14. The method of claim 12 wherein the adhesive is laminated on the backing.

15. A method of using the debondable adhesive article of claim 1 comprising:
    a) affixing the adhesive article to a substrate, and
    b) heating the debondable adhesive article such that the article recovers the permanent shape and the projections become patent, the projections weakening the bond with the substrate.

16. The method of claim 15 wherein the weakening the bond with the substrate is a reduction in the peel strength.

17. The method of claim 15 wherein the weakening the bond with the substrate is a reduction in the shear strength.

18. The method of claim 15 wherein the step of heat is induction heating.

19. The method of claim 15 wherein the step of heat is resistive heating.

* * * * *